United States Patent
Jiang et al.

(10) Patent No.: US 8,246,874 B2
(45) Date of Patent: Aug. 21, 2012

(54) METHOD FOR MAKING CARBON NANOTUBE-BASED DEVICE

(75) Inventors: Kai-Li Jiang, Beijing (CN); Shou-Shan Fan, Beijing (CN)

(73) Assignees: Tsinghua University, Beijing (CN); Hon Hai Precisions Industry Co., Ltd., Tu-Cheng, New Taipei (TW)

( * ) Notice: Subject to any disclaimer, the term of this patent is extended or adjusted under 35 U.S.C. 154(b) by 717 days.

(21) Appl. No.: 11/309,744

(22) Filed: Sep. 21, 2006

(65) Prior Publication Data

US 2007/0237952 A1    Oct. 11, 2007

(30) Foreign Application Priority Data

Dec. 2, 2005   (TW) ................ 94142457 A
Dec. 6, 2005   (CN) ............. 2005 1 0102323

(51) Int. Cl.
    *B29C 47/88* (2006.01)
(52) U.S. Cl. .............. 264/103; 264/211.14; 264/211.17; 264/340; 264/345; 264/430
(58) Field of Classification Search ........... 264/1.3, 264/221.14, 211.17, 345, 235, 346
See application file for complete search history.

(56) References Cited

U.S. PATENT DOCUMENTS

| | | | |
|---|---|---|---|
| 4,164,841 A * | 8/1979 | Borenstein et al. ............. 57/350 |
| 6,540,972 B1 * | 4/2003 | Hiura ........................... 423/448 |
| 6,682,677 B2 | 1/2004 | Lobovsky et al. | |
| 6,790,425 B1 | 9/2004 | Smalley et al. | |
| 6,957,993 B2 | 10/2005 | Jiang et al. | |
| 7,045,108 B2 | 5/2006 | Jiang et al. | |
| 2002/0113335 A1 | 8/2002 | Lobovsky et al. | |
| 2003/0049443 A1 * | 3/2003 | Nishimura et al. ........... 428/364 |
| 2003/0069792 A1 | 4/2003 | Blumenthal | |
| 2003/0198812 A1 | 10/2003 | Rueckes et al. | |
| 2004/0051432 A1 * | 3/2004 | Jiang et al. .................... 313/311 |
| 2004/0217520 A1 | 11/2004 | Hong et al. | |
| 2008/0170982 A1 * | 7/2008 | Zhang et al. ............... 423/447.3 |

FOREIGN PATENT DOCUMENTS

| | | |
|---|---|---|
| JP | 61266666 | 11/1986 |
| JP | 62141171 | 6/1987 |
| JP | 63264918 | 11/1988 |
| JP | 2004036038 | 2/2004 |
| JP | P2004-217456 A | 8/2004 |
| JP | 2004277907 | 10/2004 |
| JP | 2005089738 | 4/2005 |
| JP | P2005-154950 A | 6/2005 |
| WO | WO 01/53199 A2 | 7/2001 |
| WO | WO2004052489 | 6/2004 |

* cited by examiner

*Primary Examiner* — Christina Johnson
*Assistant Examiner* — Xue Liu
(74) *Attorney, Agent, or Firm* — Altis Law Group, Inc.

(57) ABSTRACT

A method for making a carbon nanotube-based device includes the steps of: providing a carbon nanotube yarn; preforming the carbon nanotube yarn into a predetermined shape; and heating the preformed carbon nanotube yarn so as to enable the carbon nanotube yarn to memorize the predetermined shape.

20 Claims, 3 Drawing Sheets

METHOD FOR MAKING CARBON NANOTUBE-BASED DEVICE

CROSS REFERENCE TO RELATED APPLICATION

This application is related to a commonly-assigned copending application Ser. No. 11/586,976, entitled "CARBON NANOTUBE YARN AND METHOD FOR MAKING THE SAME".

FIELD OF THE INVENTION

The present invention relates to methods for making carbon nanotube-based device and, more particularly, to a method for making a carbon nanotube-based device containing a carbon nanotube yarn.

DESCRIPTION OF RELATED ART

Carbon nanotubes are very small tube-shaped structures essentially having the composition of a graphite sheet, formed as a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes have very good electrical conductance due to their structure. They are also chemically stable, and have very small diameters (less than 100 nanometers) and large aspect ratios (length/diameter). Due to these and other properties, it has been suggested that carbon nanotubes can play an important role in fields such as microscopic electronics, materials science, biology, and chemistry, etc.

Carbon nanotube yarn production was reported in an article by S. S. Fan et al. entitled "Spinning continuous carbon nanotube yarns" (Nature, Vol. 419, Oct. 24, 2002, pp. 801). Carbon nanotube yarns can be obtained by being drawn out from a super-aligned carbon nanotube array in which the carbon nanotubes are aligned parallel to one another and are held together by van der Waals force interactions to form bundles.

Since carbon nanotubes have properties making them highly useful in optical, electrical, and mechanical applications, continuous carbon nanotube yarn promises even greater applicability. For example, the carbon nanotube yarn can be used as electron emission sources of field emission displays. The carbon nanotube yarn can be also used as polarizers, light filaments, etc.

However, the carbon nanotube yarn drawn out by the above mentioned method are in filamentary form, i.e., they are fragile and unable to endure higher pressure or weight. This characteristic greatly limits their application, especially in large-scale applications.

What is needed, therefore, is a method for making carbon nanotube-based device containing a carbon nanotube yarn in large-scale application.

SUMMARY OF THE INVENTION

A method for making a carbon nanotube-based device according to a preferred embodiment includes the steps of: providing a carbon nanotube yarn; preforming the carbon nanotube yarn into a predetermined shape; and heating the preformed carbon nanotube yarn so as to enable the carbon nanotube yarn to memorize the predetermined shape.

A carbon nanotube-based device manufactured by a method according to another preferred embodiment includes the steps of: providing a carbon nanotube yarn; preforming the carbon nanotube yarn into a predetermined shape; and heating the preformed carbon nanotube yarn so as to enable the carbon nanotube yarn to memorize the predetermined shape.

The present method for making a carbon nanotube-based device enables the carbon nanotube yarn to memorize a predetermined shape by heating. Therefore, the resulting carbon nanotube-based device has an improved mechanical strength and thus may find more potential applications, especially in large-scale applications.

Other advantages and novel features will become more apparent from the following detailed description of present method of making carbon nanotube-based device, when taken in conjunction with the accompanying drawings.

BRIEF DESCRIPTION OF THE DRAWINGS

Many aspects of the present method of making carbon nanotube-based device can be better understood with reference to the following drawings. The components in the drawings are not necessarily drawn to scale, the emphasis instead being placed upon clearly illustrating the principles of the present method of making carbon nanotube-based device. Moreover, in the drawings, like reference numerals designate corresponding parts throughout the several views.

DETAILED DESCRIPTION OF THE INVENTION

Reference will now be made to the drawings to describe a preferred embodiment of the present method for making carbon nanotube-based device, in detail.

Figure 1:
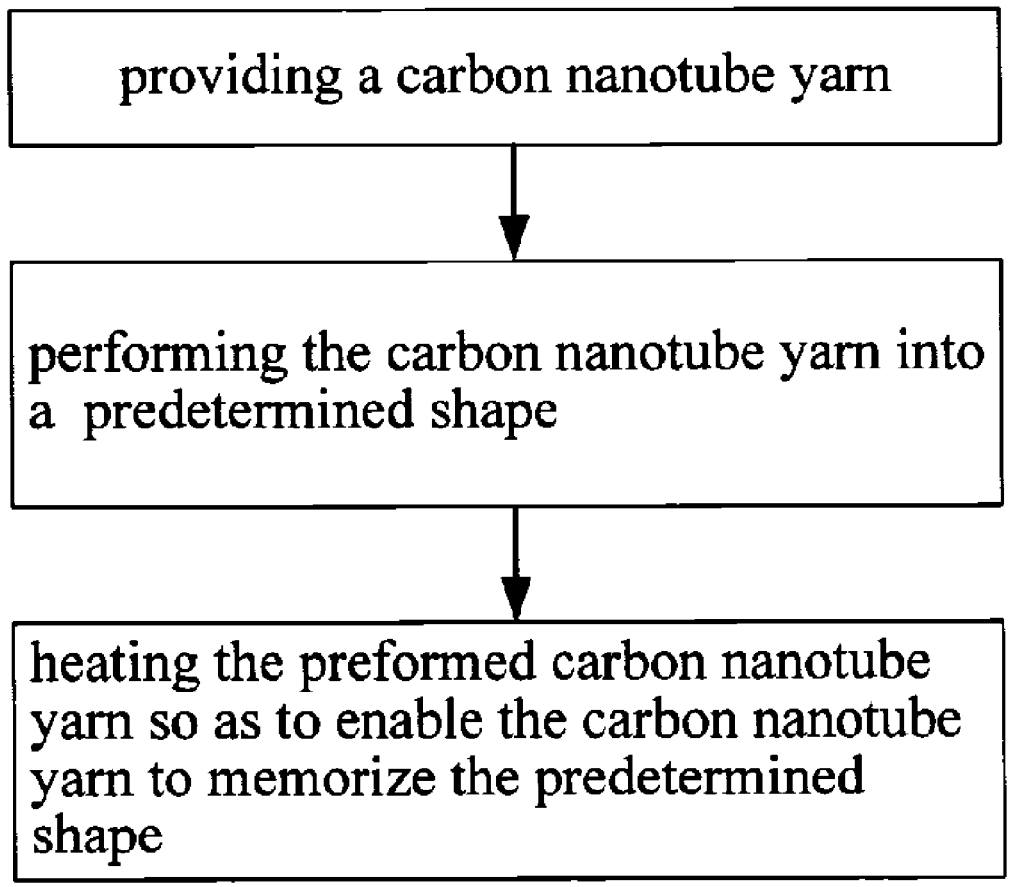
FIG. 1 is a flow chart of a method for making carbon nanotube-based device in accordance with a preferred embodiment.

Referring to FIG. 1, a method for making carbon nanotube-based device in accordance with a preferred embodiment, includes the following steps:

providing a carbon nanotube yarn;
preforming the carbon nanotube yarn into a predetermined shape; and
heating the preformed carbon nanotube yarn so as to enable the carbon nanotube yarn to memorize the predetermined shape.

In the first step, a carbon nanotube yarn is provided. The first step of providing the carbon nanotube yarn includes the steps of:

growing a carbon nanotube array;
drawing a bundle of carbon nanotubes from the carbon nanotube array to form the carbon nanotube yarn; and
soaking the carbon nanotube yarn in an organic solvent.

In one embodiment, the first step of providing the carbon nanotube yarn includes the steps of:

providing a carbon nanotube array that is able to have one or more carbon nanotube yarn strings drawn therefrom;
drawing out at least one planar carbon nanotube yarn string from the carbon nanotube array;
applying volatilizable organic solvent to the at least one carbon nanotube yarn string;
removing the organic solvent such that the at least one planar carbon nanotube yarn string shrinks into a single non-planar strand of carbon nanotube yarn due to the surface tension of the organic solvent.

The carbon nanotube array is grown using a chemical vapor deposition method. The method is described in U.S. Pat. No. 7,045,108, which is incorporated herein by reference. Firstly, a substrate is provided, and the substrate is a substrate of p type silicon or n type silicon. Secondly, a catalyst layer is deposited on the substrate. The catalyst layer is made of a material selected from a group consisting of iron (Fe), cobalt (Co), nickel (Ni), and their alloys. Thirdly, the substrate with the catalyst layer is annealed at a temperature in an approximate range from 300 to 400 degrees centigrade under a protecting gas for about 10 hours. Fourthly, the substrate with the catalyst layer is heated to approximately 500 to 700 degrees centigrade and a mixed gas including a carbon containing gas and a protecting gas is introduced for about 5 to 30 minutes to grow a super-aligned carbon nanotube array. The carbon containing gas can be a hydrocarbon gas, such as acetylene or ethane. The protecting gas can be an inert gas. The grown carbon nanotubes are aligned parallel in columns and held together by van der Waals force interactions. The carbon nanotube array has a high density and each one of the carbon nanotubes has an essentially uniform diameter.

A carbon nanotube yarn may be obtained by drawing a bundle of the carbon nanotubes from the super-aligned carbon nanotube array. Firstly, a bundle of the carbon nanotubes including at least one carbon nanotube, is selected. Secondly, the bundle of the carbon nanotubes is drawn out using forceps, to form a carbon nanotube yarn along the drawn direction. The bundles of the carbon nanotubes are connected together by van der Waals force interactions to form a continuous carbon nanotube yarn.

The carbon nanotube yarn is soaked in an organic solvent. Since the untreated carbon nanotube yarn is composed of a plurality of bundles of the carbon nanotubes, the untreated carbon nanotube yarn has a high surface area to volume ratio and thus may easily become stuck to other objects. During the surface treatment, the carbon nanotube yarn is shrunk due to factors such as surface tension. The surface area to volume ratio and diameter of the treated carbon nanotube yarn is reduced. Accordingly, the stickiness of the carbon nanotube yarn is lowered or eliminated, and strength and toughness of the carbon nanotube yarn is improved. The organic solvent may be a volatilizable organic solvent, such as ethanol, methanol, acetone, dichloroethane, chloroform, and any combination thereof.

Preferably, another method for providing a carbon nanotube yarn is described in the commonly-assigned copending application Ser. No. 11/586,976, entitled "CARBON NANOTUBE YARN AND METHOD FOR MAKING THE SAME". In this method, the first step of providing the carbon nanotube yarn includes the steps of:
growing a carbon nanotube array;
drawing out a number of carbon nanotube yarn strings from the carbon nanotube array; and
treating the number of carbon nanotube yarn strings using an organic solvent in a manner such that the number of carbon nanotube yarn strings are formed into a single strand of carbon nanotube yarn.

The carbon nanotube array is grown as described above. A number of carbon nanotube yarn strings are drawn out from the carbon nanotube array. Each one of the carbon nanotube yarn strings are formed from a number of bundles of the carbon nanotubes connecting together by van der Waals force interactions. Then the carbon nanotube yarn strings are treated using an organic solvent in a manner such that the number of carbon nanotube yarn strings are formed into a single strand of carbon nanotube yarn. The carbon nanotube yarn is formed by treating the number of carbon nanotube yarn strings using an organic solvent, so the carbon nanotube yarn shrinks as a result of factors such as surface tension. The organic solvent may be a volatilizable organic solvent, such as ethanol, methanol, acetone, dichloroethane, chloroform, and any combination thereof.

In the second step, the carbon nanotube yarn is preformed into a predetermined shape by a shaping device. The shaping device has a periphery of a certain geometric shape, and the carbon nanotube yarn can be bound or attached to the shaping device to form the preformed carbon nanotube yarn with a predetermined shape corresponding to the periphery of the shaping device.

In the third step, the preformed carbon nanotube yarn is heated to enable the carbon nanotube yarn to memorize the predetermined shape. The preformed carbon nanotube yarn should be heated at a predetermined temperature for a certain period of time sufficient to memorize the predetermined shape. The predetermined temperature is advantageously in an approximate range from 600 to 2000 degrees centigrade and, more preferably, in an approximate range from 1600 to 1700 degrees centigrade. For example, the preformed carbon nanotube yarn may be heated by flowing an electric current therethrough, i.e., by applying a direct current to the preformed carbon nanotube yarn for approximate 1~4 hours to enable the carbon nanotube yarn to memorize the predetermined shape. Generally, the period of time in which an electric current heats the preformed carbon nanotube yarn may beneficially be less than 4 hours in order to avoid defects occurring in the carbon nanotube yarn and a significant loss of carbon from the carbon nanotube yarn. Alternatively, the preformed carbon nanotube yarn may be heated in a vacuum chamber, such as a graphite furnace, for about 0.5 to 1 hour to form the carbon nanotube-based device with the predetermined shape. It is noted that, since the graphite furnace itself contains carbon, the loss of carbon from the carbon nanotube yarn is avoided even when the heating of the preformed carbon nanotube yarn lasts for a relatively long time. In addition, a longer heating treatment in the graphite furnace may advantageously compensate for some defects in the carbon nanotube yarns of the carbon nanotube-based device.

After the heating treatment, the adjacent carbon nanotube segments of the carbon nanotube yarns are firmly bonded together, and a mechanical strength thereof is accordingly improved.

Example 1

Figure 2:
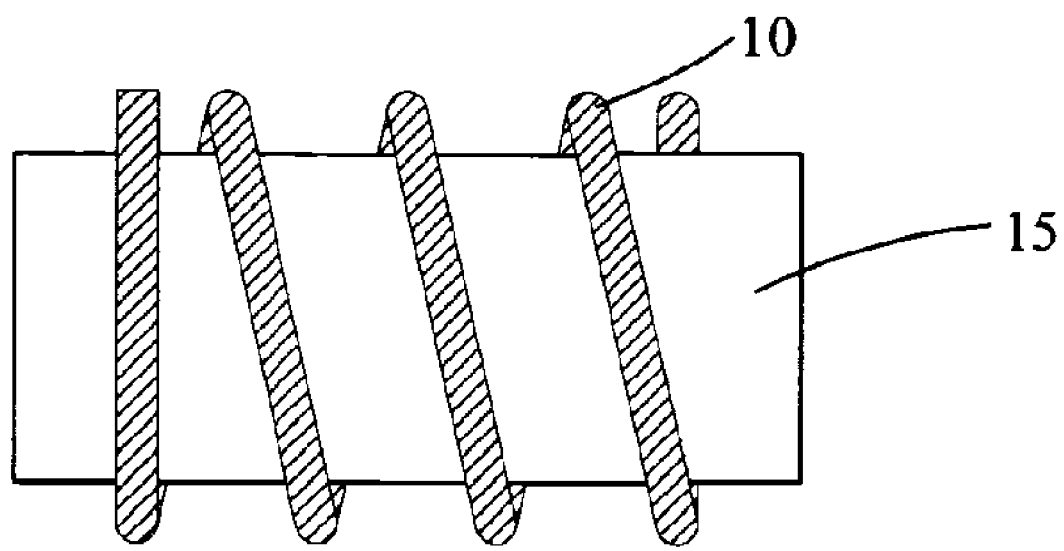
FIG. 2 is a schematic, side view of a carbon nanotube-based spring according to a second embodiment.

Referring to FIG. 2, a method for making a carbon nanotube-based spring in accordance with an embodiment is described as follows.

A carbon nanotube yarn 10 is provided and submerged in an organic solvent for processing the facies thereof. A shaping device 15 is provided. The shaping device 15 made of sapphire and has a cylindrical outline. The carbon nanotube yarn 10 is twisted around the shaping device 15 and arranged in a spiral shape for forming a spring. Then, the carbon nanotube yarn 10 twisted around the shaping device 15 is heated by an electric current to a predetermined temperature of about 1600 degrees centigrade for about 3 to 4 hours. The carbon nanotube yarn 10 is formed into the spiral shape after removing the shaping device 15 so that a carbon nanotube-based spring is produced.

Example 2

Figure 3:
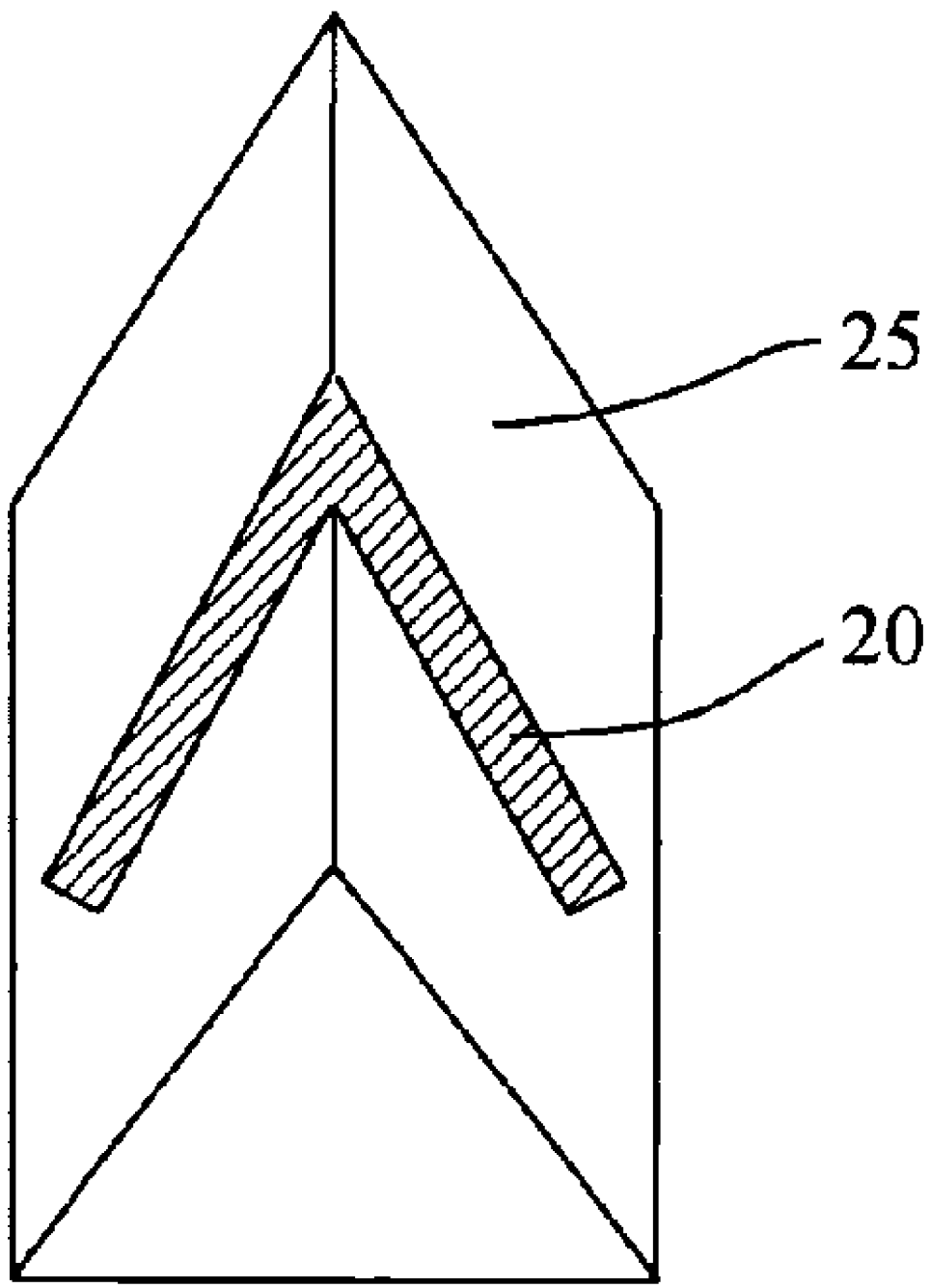
FIG. 3 is a schematic, isometric view of a carbon nanotube-based electron emitting device according to a third embodiment.

Referring to FIG. 3, a method for making a carbon nanotube-based electron emitting device in accordance with another preferred embodiment is described as follows.

The method used in example 2 is similar to that of example 1. However, the shaping device 25 is a prism-shaped sapphire which has two adjacent side surfaces forming a V-shaped outline. The carbon nanotube yarn 20 is attached to the two side surfaces of the shaping device 25 and forms a V-shaped electron emitting device. Then, the carbon nanotube yarn 20 is heated by an electric current to a predetermined temperature of about 1600 degrees centigrade for about 3 to 4 hours. The carbon nanotube yarn 20 is formed into the V shape after removing the shaping device 25 so that a V-shaped carbon nanotube-based electron emitting device is produced.

It is understood that the present method can be employed to make other carbon nanotube-based device with different solidified shapes from carbon nanotube yarns. The carbon nanotube yarns memorize a predetermined shape through the present method. The resulted carbon nanotube-based devices have an improved mechanical strength and thus may find more potential applications, especially in large-scale applications.

It is to be understood that the above-described embodiment is intended to illustrate rather than limit the invention. Variations may be made to the embodiment without departing from the spirit of the invention as claimed. The above-described embodiments are intended to illustrate the scope of the invention and not restricted to the scope of the invention.

What is claimed is:

1. A method for making a carbon nanotube-based device, the method comprising the steps of:
    providing a carbon nanotube yarn;
    preforming the carbon nanotube yarn into a predetermined shape by an shaping device;
    memorizing the predetermined shape by heating the preformed carbon nanotube yarn; and
    removing the shaping device and keeping the carbon nanotube yarn in the predetermined shape,
    wherein the carbon nanotube yarn consists of a plurality of carbon nanotubes and is formed from at least one carbon nanotube yarn string drawn from a carbon nanotube array that is treated by a volatilizable organic solvent.

2. The method as claimed in claim 1, wherein the step of providing the carbon nanotube yarn comprises the following steps:
    growing the carbon nanotube array;
    drawing out a plurality of carbon nanotube yarn strings from the carbon nanotube array; and
    treating the plurality of carbon nanotube yarn strings using the volatilizable organic solvent.

3. The method as claimed in claim 1, wherein the at least one carbon nanotube yarn string is soaked in the volatilizable organic solvent.

4. The method as claimed in claim 1, wherein the volatilizable organic solvent is selected from the group consisting of ethanol, methanol, acetone, dichloroethane, chloroform and any combination thereof.

5. The method as claimed in claim 1, wherein in the step of preforming the carbon nanotube yarn into the predetermined shape, the carbon nanotube yarn is bound or attached to the shaping device.

6. The method as claimed in claim 1, wherein the shaping device has a periphery of a certain geometric shape, and the carbon nanotube yarn is disposed on the shaping device to form the preformed carbon nanotube yarn with a predetermined shape corresponding to the periphery of the shaping device.

7. The method as claimed in claim 6, wherein the shaping device is a cylindrical sapphire, and the carbon nanotube yarn is preformed into a spiral shape by wrapping around the shaping device.

8. The method as claimed in claim 7, wherein a carbon nanotube spring is obtained after removing the shaping device.

9. The method as claimed in claim 6, wherein the shaping device is a prism-shaped sapphire, and the carbon nanotube yarn is preformed into a V shape by attaching to two side surfaces of the shaping device.

10. The method as claimed in claim 1, wherein the preformed carbon nanotube yarn is heated in a vacuum chamber.

11. The method as claimed in claim 1, wherein the preformed carbon nanotube yarn is heated by flowing an electric current therethrough.

12. The method as claimed in claim 1, wherein the preformed carbon nanotube yarn is heated for a time period of less than four hours.

13. The method as claimed in claim 1, wherein the preformed carbon nanotube yarn is heated at a temperature in a range from about 600 degrees centigrade to about 2000 degrees centigrade.

14. The method as claimed in claim 13, wherein the preformed carbon nanotube yarn is heated at a temperature in a range from about 1600 degrees centigrade to about 1700 degrees centigrade.

15. A method for making a carbon nanotube-based device, the method comprising the steps of:
    providing a carbon nanotube array that is able to have one or more carbon nanotube yarn strings drawn therefrom;
    drawing out at least one planar carbon nanotube yarn string from the carbon nanotube array;
    applying volatilizable organic solvent to the at least one planar carbon nanotube yarn string;
    removing the organic solvent such that the at least one planar carbon nanotube yarn string shrinks into a single non-planar strand of carbon nanotube yarn due to the surface tension of the organic solvent;
    preforming the single non-planar strand of carbon nanotube yarn into a predetermined shape by attaching the single non-planar strand of carbon nanotube yarn to a shaping device;
    heating the preformed single non-planar strand of carbon nanotube yarn so as to enable the single non-planar strand of carbon nanotube yarn to memorize the predetermined shape; and
    removing the shaping device and keeping the preformed single non-planar strand of carbon nanotube yarn in the predetermined shape.

16. A method for making a carbon nanotube-based spring, the method comprising the steps of:
    providing a carbon nanotube array that is able to have one or more carbon nanotube yarn strings drawn therefrom;
    drawing out at least one planar carbon nanotube yarn string from the carbon nanotube array;
    applying volatilizable organic solvent to the at least one carbon nanotube yarn string;
    removing the organic solvent such that the at least one planar carbon nanotube yarn string shrinks into a single non-planar strand of carbon nanotube yarn due to the surface tension of the organic solvent;
    preforming the single non-planar strand of carbon nanotube yarn into a spiral shape by attaching the single non-planar strand of carbon nanotube yarn on a shaping device;

heating the preformed single non-planar strand of carbon nanotube yarn so as to enable the single non-planar strand of carbon nanotube yarn to memorize the spiral shape; and removing the shaping device to obtain a carbon nanotube spring.

17. The method as claimed in claim 16, wherein the volatilizable organic solvent is selected from the group consisting of ethanol, methanol, acetone, dichloroethane, chloroform and any combination thereof.

18. The method as claimed in claim 16, wherein the step of preforming the single non-planar strand of carbon nanotube yarn into the spiral shape is performed by coiling the single non-planar strand of carbon nanotube yarn around a cylindrical sapphire in a spiral shape.

19. The method as claimed in claim 16, wherein in the step of heating the preformed single non-planar strand of carbon nanotube yarn, the single non-planar strand of carbon nanotube yarn is heated by an electric current.

20. The method as claimed in claim 16, wherein in the step of heating the preformed single non-planar strand of carbon nanotube yarn, the single non-planar strand of carbon nanotube yarn is heated to a predetermined temperature of about 1600 degrees centigrade for about 3 hours to about 4 hours.

* * * * *

UNITED STATES PATENT AND TRADEMARK OFFICE
CERTIFICATE OF CORRECTION

PATENT NO. : 8,246,874 B2  
APPLICATION NO. : 11/309744  
DATED : August 21, 2012  
INVENTOR(S) : Jiang et al.

Page 1 of 1

It is certified that error appears in the above-identified patent and that said Letters Patent is hereby corrected as shown below:

On the title page Item [73] should read

[73]  Tsinghua University, Beijing (CN); Hon Hai Precision Industry Co., Ltd., Tu-Cheng, New Taipei (TW)

Signed and Sealed this  
Twenty-ninth Day of October, 2013

Teresa Stanek Rea  
*Deputy Director of the United States Patent and Trademark Office*